United States Patent
Gavali et al.

(10) Patent No.: US 12,321,605 B2
(45) Date of Patent: Jun. 3, 2025

(54) OPTIMIZING INPUT/OUTPUT OPERATIONS PER SECTION OF REMOTE PERSISTENT STORAGE

(71) Applicant: International Business Machines Corporation, Armonk, NY (US)

(72) Inventors: Pramod V Gavali, Pune (IN); Shaikh Ikhlaque Ali, Bangalore (IN); Vinod A. Valecha, Pune (IN); Akash V. Gunjal, Belgaum (IN)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 18/310,800

(22) Filed: May 2, 2023

(65) Prior Publication Data
US 2024/0370171 A1 Nov. 7, 2024

(51) Int. Cl.
*G06F 3/06* (2006.01)

(52) U.S. Cl.
CPC .......... *G06F 3/0613* (2013.01); *G06F 3/0646* (2013.01); *G06F 3/067* (2013.01)

(58) Field of Classification Search
CPC ....... G06F 3/0613; G06F 3/0646; G06F 3/067
See application file for complete search history.

(56) References Cited

U.S. PATENT DOCUMENTS

| | | | | |
|---|---|---|---|---|
| 9,785,360 B1* | 10/2017 | Ravindranath | ....... | G06F 3/0659 |
| 2017/0371828 A1* | 12/2017 | Brewer | .................. | G06F 13/28 |
| 2020/0401343 A1* | 12/2020 | Lan | .......................... | G06F 3/067 |
| 2022/0035574 A1* | 2/2022 | Cain | .................... | G06F 3/0613 |
| 2022/0335009 A1 | 10/2022 | Paul et al. | | |

OTHER PUBLICATIONS

Microsoft, "Microsoft Sync Framework—Product Information", https://learn.microsoft.com/en-us/previous-versions/sql/synchronization/mt490617(v=msdn.10), (Retrieved: Mar. 21, 2023), 3 pages.
Xu, et al., "Performance Analysis of Containerized Applications on Local and Remote Storage," In International Conference on Massive Storage Systems and Technology (MSST), 2017, 12 pages.

\* cited by examiner

*Primary Examiner* — Hosain T Alam
*Assistant Examiner* — Subir Kumar Chowdhury
(74) *Attorney, Agent, or Firm* — Cantor Colburn LLP; Teddi Maranzano

(57) ABSTRACT

A computer-implemented method for optimizing input/output (I/O) operations per second (IOPS) of remote storage. The computer-implemented method includes receiving requests for read operations and write operations from users of an application, dynamically creating batches into which the requests can be aggregated, aggregating the requests into the batches and asynchronously passing each completed batch to the remote storage.

17 Claims, 7 Drawing Sheets

OPTIMIZING INPUT/OUTPUT OPERATIONS PER SECTION OF REMOTE PERSISTENT STORAGE

BACKGROUND

The present invention generally relates to computing systems, and more specifically, to a method of cognitively optimizing input/output (I/O) operations per second (IOPS) of remote persistent storage for container workloads.

Cloud computing is the on-demand availability of computer system resources, especially data storage (cloud storage) and computing power, without direct active management by the user. Large clouds often have functions distributed over multiple locations, each of which is a data center. Cloud computing relies on sharing of resources to achieve coherence.

SUMMARY

Embodiments of the present invention are directed to a computer-implemented method for optimizing input/output (I/O) operations per second (IOPS) of remote storage. The computer-implemented method includes receiving requests for read operations and write operations from users of an application, dynamically creating batches into which the requests can be aggregated, aggregating the requests into the batches and asynchronously passing each completed batch to the remote storage.

As a result of an execution of the computer-implemented method, performance of read/write operations to remote storage can be executed and completed much faster than what has previously been possible. This is achieved by aggregating transactions into batches that can be sent to remote storage and thereby not relying on a transaction rate of the remote storage while still ensuring transaction atomicity and consistency. The method optimizes the performance of transaction-based applications using different types of database management software. At the same time, non-transaction-based applications can leverage NAS local cache capabilities to improve read/write operations.

In accordance with additional or alternative embodiments of the invention, the computer-implemented method further includes asynchronously passing each completed batch and each uncompleted batch to the remote storage in an event of a restart of the application.

In accordance with additional or alternative embodiments of the invention, the computer-implemented method further includes receiving additional requests for read/write operations from the users, distinguishing the additional requests from the requests and passing the additional requests to local storage.

In accordance with additional or alternative embodiments of the invention, the computer-implemented method further includes aggregating the additional requests into batches with the requests.

In accordance with additional or alternative embodiments of the invention, the dynamically creating of the batches is executed in accordance with batch quantity and batch frequency determinations, the batch quantity determinations are based on pattern identification in database traffic data and the batch frequency determinations are based on relative quantities of the read operations and the write operations.

In accordance with additional or alternative embodiments of the invention, the aggregating of the requests into the batches includes grouping requests of a same type together.

In accordance with additional or alternative embodiments of the invention, the aggregating of the requests into the batches includes finding a batch for each request.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
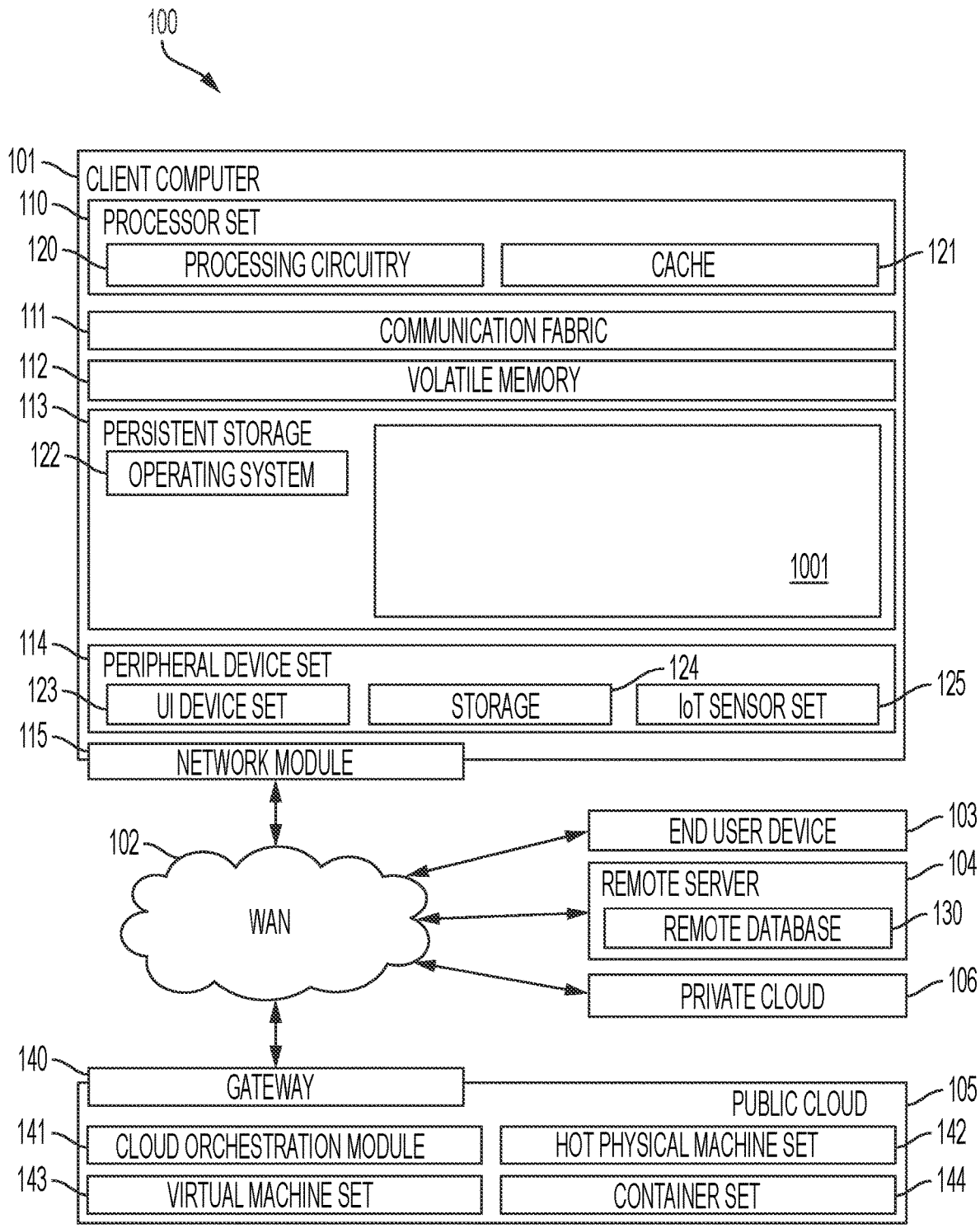
FIG. 1 is a schematic diagram of a computing environment for executing a computer-implemented method for selectively capturing traffic in a service mesh to simulate and address an issue with a service invoke chain in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, a computer or computing device 100 that implements a computer-implemented method for selectively capturing traffic in a service mesh to simulate and address an issue with a service invoke chain in accordance with one or more embodiments of the present invention is provided. The computer or computing device 100 of FIG. 1 contains an example of an environment for the execution of at least some of the computer code involved in performing the inventive methods, such as the block 1001 of the computer-implemented method for selectively capturing traffic in a service mesh to simulate and address an issue with a service invoke chain. In addition to the computer-implemented method for selectively capturing traffic in a service mesh to simulate and address an issue with a service invoke chain of block 1001, the computer or computing device 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the computer-implemented method of block 1001, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of the computer-implemented method, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

The processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In the computer-implemented method, at least some of the instructions for performing the inventive methods may be stored in the block 1001 of the computer-implemented method in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the block 1001 of the computer-implemented method typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 701 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Turning now to an overview of technologies that are more specifically relevant to aspects of the invention, applications hosted in a cloud system typically use remote persistent storage for storing application data. The remote persistent storage can be mounted on a host on which the applications are running. In these types of cases, the following scenario can play out. A customer sets up a My structure query language (MySQL) database for an application and, as part of the database configuration, the customer runs a script to create a database object (i.e., table, functions, procedures). The script mostly includes data definition language (DDL) statements and an execution of each DDL statement results in a single transaction that involves a single roundtrip to network attached storage (NAS) or remote storage. Since the script can have thousands of DDL statements, completing the script and the execution of each DDL statement can require several minutes or more. This amount of time is excessive. While the customer could alternatively use local storage instead of remote storage, which would allow the script to be completed in much less time, local storage suffers from a lack of availability and scalability.

The scenario described above illustrates that read/write operations to remote storage tend to be much slower than similar read/write operations to local storage. This is because each read/write operation to remote storage involves a roundtrip over a network, often for an atomic transaction of an application. In addition, the remote storage can have input/output operations per second (IOPS) limit that is exceeded by an application transaction. In these cases, the remote storage will operate at the relatively slow IOPS rate and application performance will degrade substantially due to transaction processing being delayed.

Given the delays associated with remote storage, it has been seen that with certain enterprise applications that are exposed to millions of users and thus can have unpredictable workloads in terms of numbers of requests per second, the applications tend to respond slowly during peak periods.

Turning now to an overview of the aspects of the invention, one or more embodiments of the invention address shortcomings of the above-described approach by providing for a method to perform read/write operations to remote storage much faster than what has previously been possible. This is achieved by aggregating transactions into batches that can be sent to remote storage and thereby not relying on a transaction rate of the remote storage while still ensuring transaction atomicity and consistency. The method optimizes the performance of transaction-based applications using different types of database management software. At the same time, non-transaction-based applications can leverage NAS local cache capabilities to improve read/write operations.

The above-described aspects of the invention address the shortcomings of known approaches by providing for a computer-implemented method for optimizing input/output (I/O) operations per second (IOPS) of remote storage. The computer-implemented method includes receiving requests for read operations and write operations from users of an application, dynamically creating batches into which the requests can be aggregated, aggregating the requests into the batches and asynchronously passing each completed batch to the remote storage.

Figure 2:
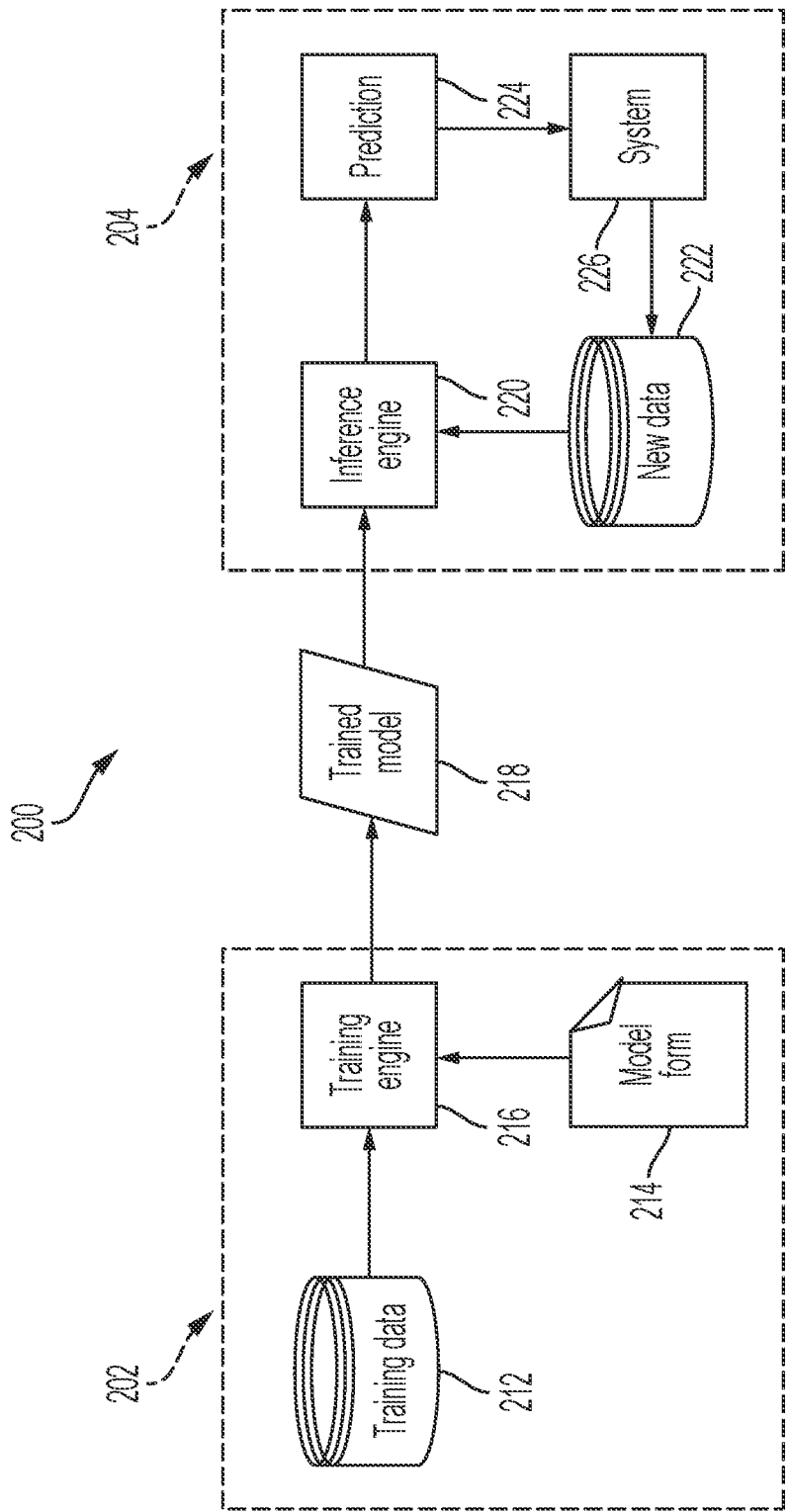
FIG. 2 is a block diagram of components of a machine learning training and inference system according to one or more embodiments of the present invention.

Turning now to a more detailed description of aspects of the present invention, FIG. 2 depicts a block diagram of components of a machine learning training and inference system 200. The machine learning training and inference system 200, in accordance with one or more embodiments of the invention, can utilize machine learning techniques to perform tasks, such as optimizing input/output (I/O) operations per second (IOPS) of remote storage by receiving requests for read operations and write operations from users of an application, dynamically creating batches into which the requests can be aggregated, aggregating the requests into the batches and asynchronously passing each completed batch to the remote storage. More specifically, one or more embodiments of the invention described herein can incorporate and utilize rule-based decision making and artificial intelligence (AI) reasoning to accomplish the various operations described herein, namely.

Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information during a web conference, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Figure 3:
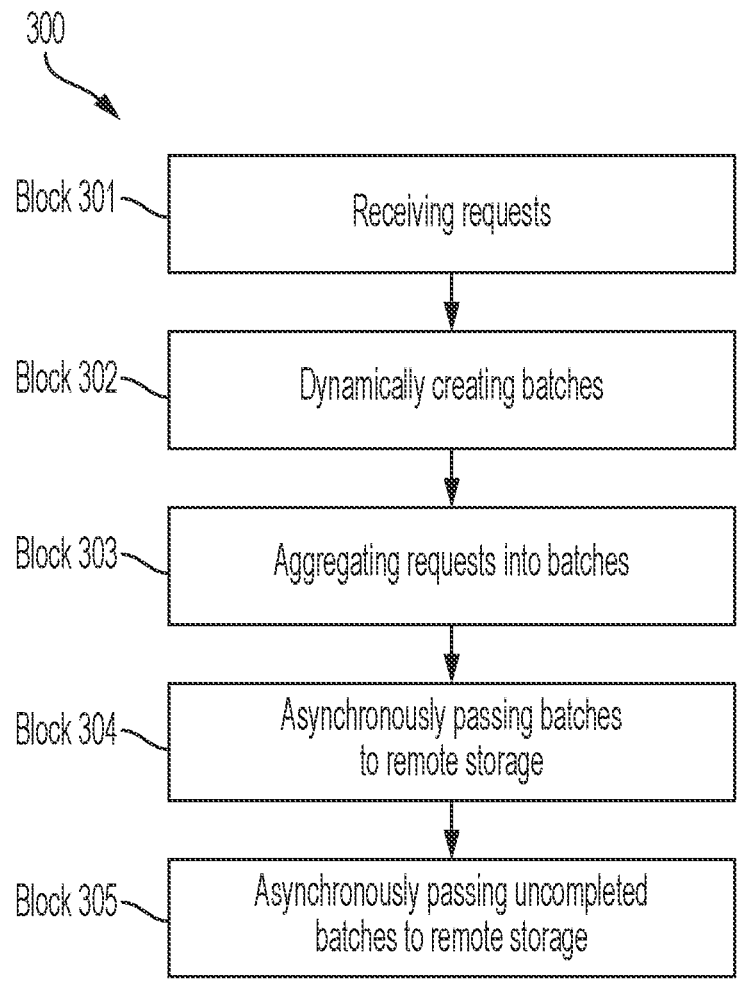
FIG. 3 is a flow diagram illustrating a computer-implemented method for optimizing input/output (I/O) operations per second (IOPS) of remote storage in accordance with one or more embodiments of the present invention.

With reference to FIG. 3, a computer-implemented method 300 is provided for optimizing input/output (I/O) operations per second (IOPS) of remote storage. As shown in FIG. 3, the computer-implemented method 300 includes receiving requests for read operations and write operations from users of an application (block 301), dynamically creating batches into which the requests can be aggregated (block 302), aggregating the requests into the batches (block 303) and asynchronously passing each completed batch to the remote storage (block 304). In an event of a restart of the application, the computer-implemented method 300 can include the asynchronous passing of each completed batch to the remote storage of block 304 and asynchronously passing each uncompleted batch to the remote storage (block 305). That is, if the application is shut down and restarted with one or more batches of requests that are only partially filled, those partially filled batches will be purged to the remote storage.

Figure 4:
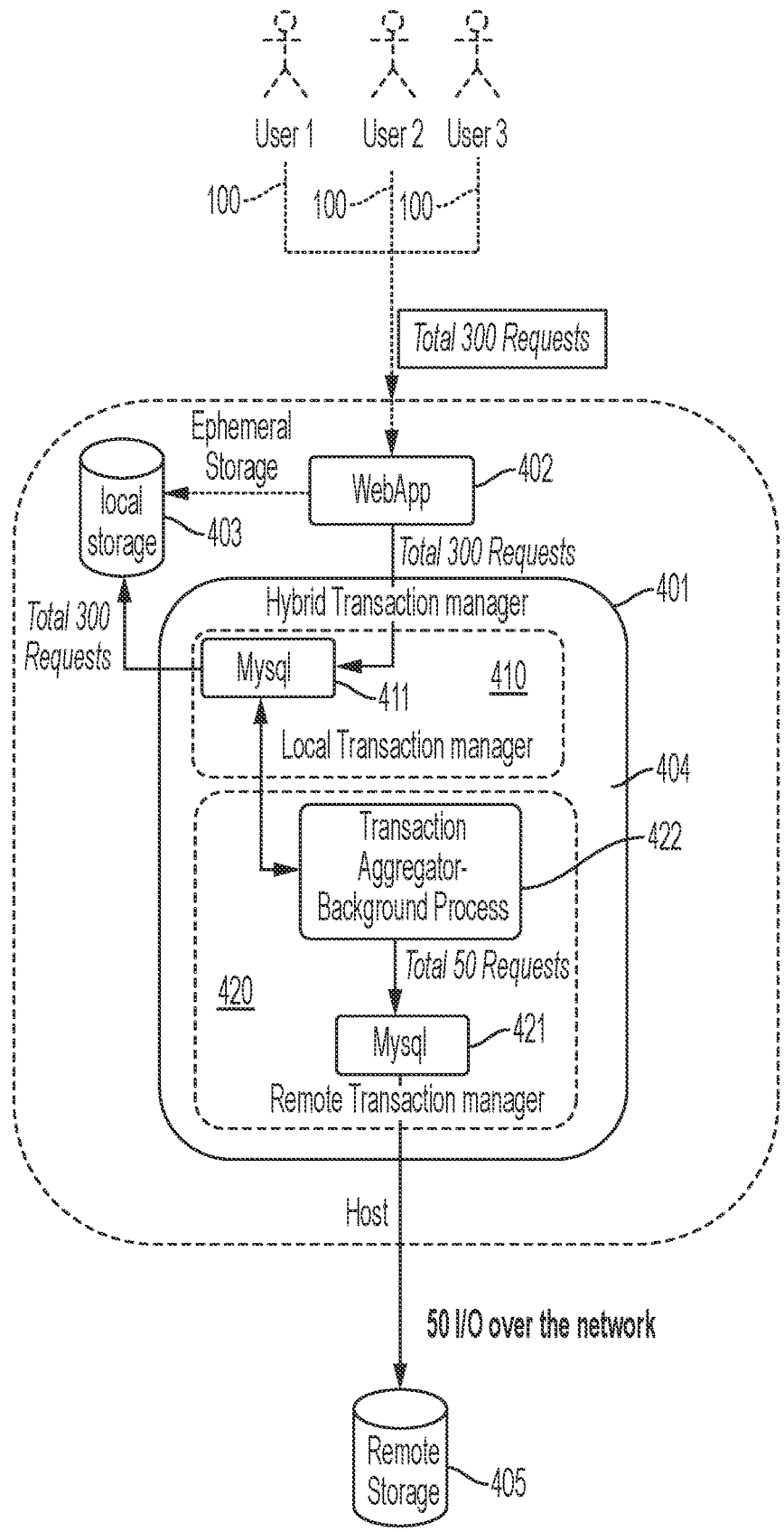
FIG. 4 is a schematic diagram illustrating a computing system for executing the computer-implemented method of FIG. 3 in accordance with one or more embodiments of the present invention.

With reference to FIG. 4, a computing system 400 is provided to execute the computer-implemented method 300 of FIG. 3. As shown in FIG. 4, the computing system 400 includes a host 401. The host 401 serves as a host of an application, such as a web application 402, which is accessed by users 1, 2 and 3. The host 401 includes local storage 403 and a hybrid transaction manager 404. The hybrid transaction manager 404 is communicatively interposed between the web application 402 and the local storage 403 and is communicatively interposed between the web application 402 and a cloud service or remote storage 405. The hybrid transaction manager 404 includes a local transaction manager 410, which includes a MySQL unit 411, and a remote transaction manager 420, which includes a MySQL unit 421 and a transaction aggregator background processing unit 422. The transaction aggregator background processing unit 422 is communicative with the MySQL unit 411 and the MySQL unit 421, the MySQL unit 411 is communicative with the local storage 403 and the MySQL unit 421 is communicative with the remote storage 405.

Requests that are received at the hybrid transaction manager 404 from each of the users 1, 2 and 3 via the web application 402 are initially analyzed by the MySQL unit 411 of the local transaction manager 410 before being forwarded to the remote transaction manager 420. The transaction aggregator background processing unit 422 of the remote transaction manager 420 creates the batches into which the requests are to be aggregated and, once the batches are created, aggregates the requests into the batches. The batches can be created dynamically in accordance with batch quantity determinations and in accordance with batch frequency determinations. The batch quantity determinations are based on pattern identification in database traffic data. Database traffic is monitored to identify those times when large numbers of transactions occur. For example, more transactions tend to occur for an e-commerce portal during Christmas, Diwali, etc. During such times, the batch quantity tends to be increased. The batch frequency determinations are based on relative quantities of the read operations and the write operations. For example, if there are 75% more read operations than write operations, it is often the case that it is important for the remote copy of the database to remain current. Thus, the batch frequency would be increased (BF++).

Figure 5:
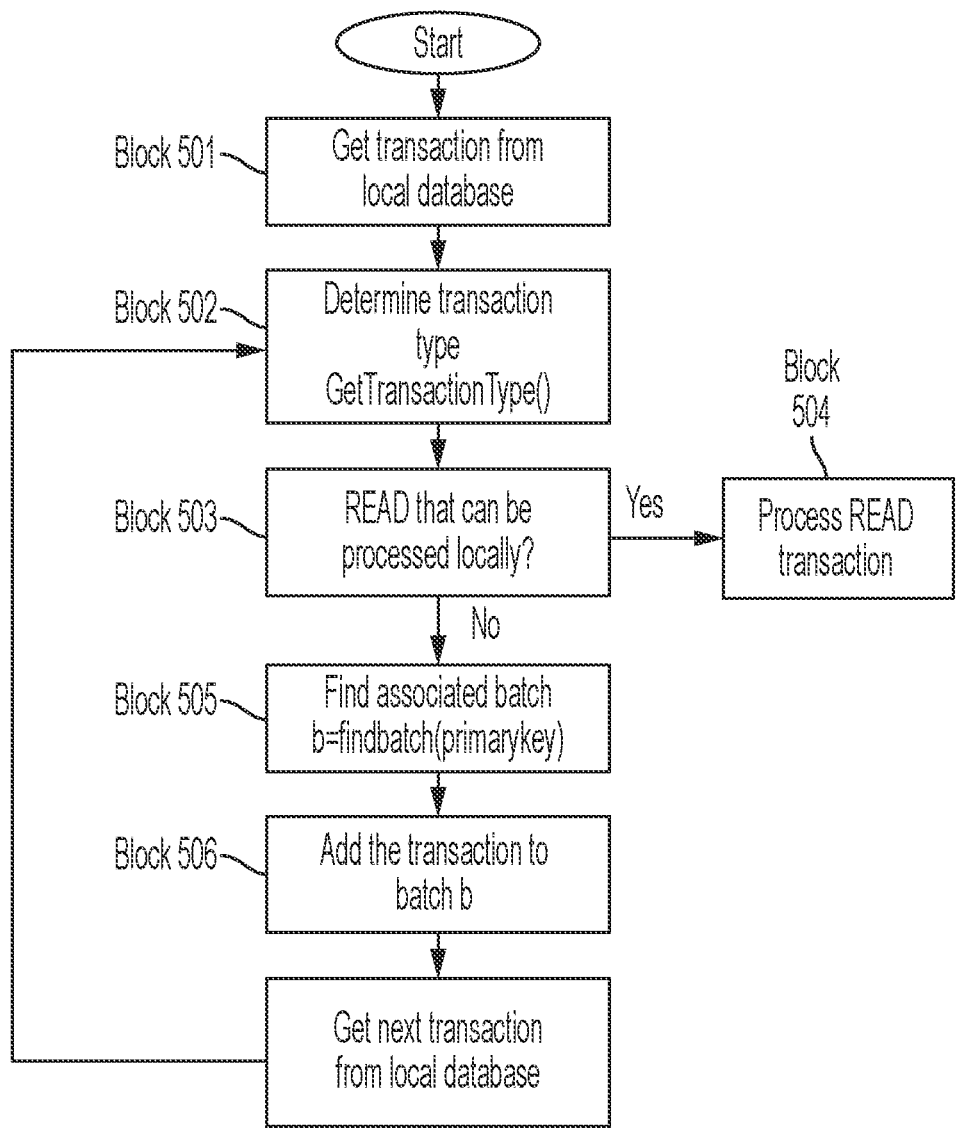
FIG. 5 is a flow diagram illustrating how like requests can be aggregated together in accordance with one or more embodiments of the present invention.
Figure 6:
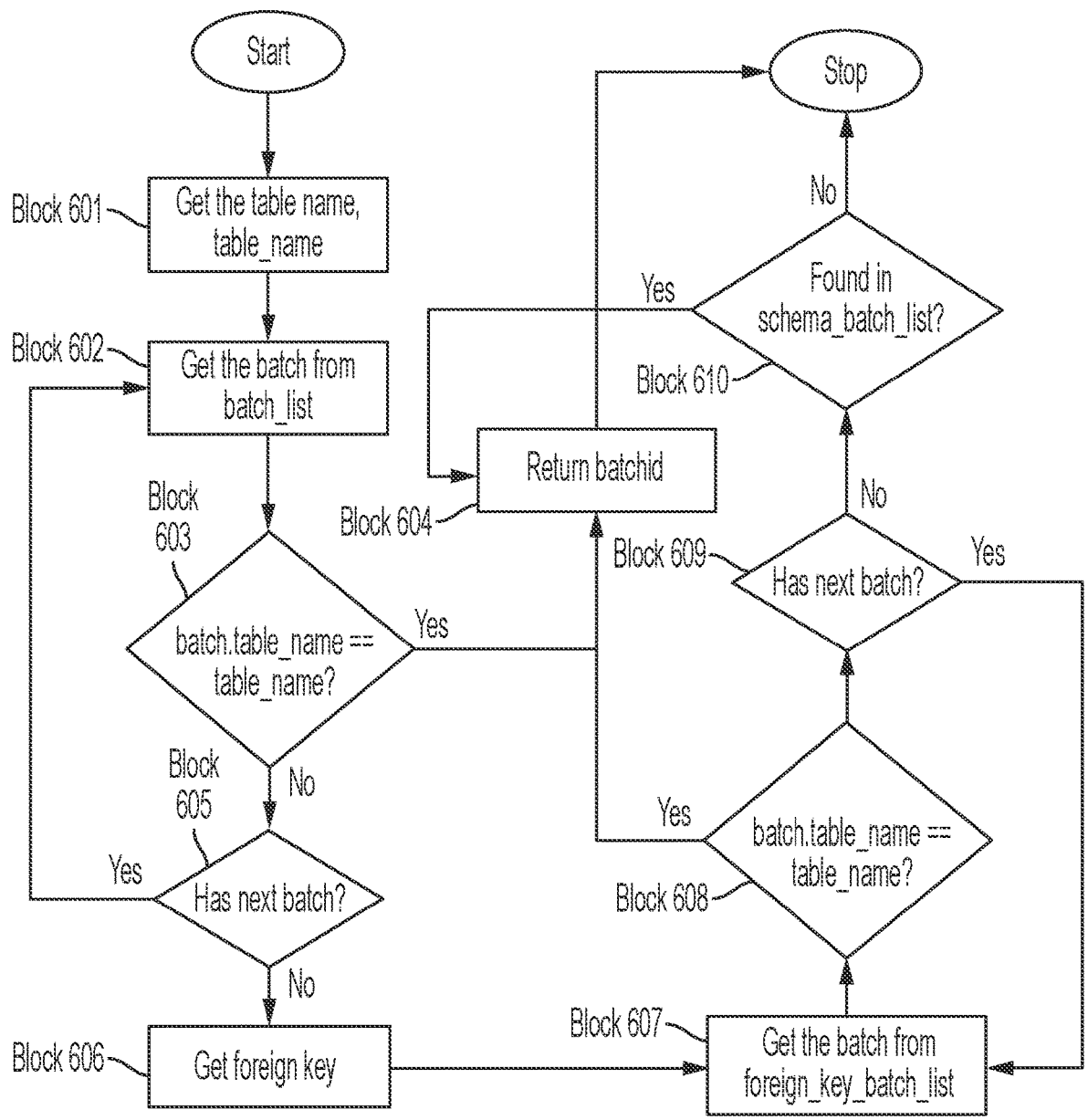
FIG. 6 is a flow diagram illustrating how a batch for a request can be found in accordance with one or more embodiments of the present invention.

With continued reference to FIG. 4 and with additional reference to FIGS. 5 and 6, the aggregating by the transaction aggregator background processing unit 422 can include a grouping of requests of a same type together (see FIG. 5) and a finding of a batch for each request (see FIG. 6). In this way, the transaction aggregator background processing unit 422 can homogenize or substantially homogenize each batch and later processing by the remote storage 405 can be improved and accelerated.

As shown in FIGS. 4 and 5, the transaction aggregator background processing unit 422 receives a transaction (i.e., request for a read operation or a write operation) from the MySQL unit 411 (block 501) and determines its type (block 502). In an event the transaction is determined to be a request for a read operation that can be processed locally (block 503), the transaction aggregator background processing unit 422 returns the transaction to the MySQL unit 411 for processing at the local storage 403 (block 504). In an event the transaction is determined to be a write operation or a type of read operation that cannot be processed locally, the transaction aggregator background processing unit 422 finds an associated batch (block 505), adds the transaction to the associated batch (block 506) and obtains a next transaction from the MySQL unit 411 (block 507).

As shown in FIGS. 4 and 6, the transaction aggregator background processing unit 422 finds the associated batch of block 505 according to the following process. Initially, the transaction aggregator background processing unit 422 obtains a table name that describes at least a type of the transaction being requested (block 601) and obtains a list of the presently created batches that have not yet been passed to the remote storage 405 (block 602). The transaction aggregator background processing unit 422 then compares the table name with the batch list to determine if there is a match (block 603). If there is a match, the batch identification from the batch list is returned (block 604). If no match exists, the transaction aggregator background processing unit 422 will determine if a new batch has been created which is not listed in the batch list (block 605). If a new batch exists, control returns to block 602. If not, the transaction aggregator background processing unit 422 will obtain a foreign key (block 606) and obtain a list of presently created batches that have not yet been passed to the remote storage from the foreign key (block 607). The transaction aggregator background processing unit 422 then compares the table name with the batch list of the foreign key to determine if there is a match (block 608). If there is a match, the batch identification from the batch list of the foreign key is returned (block 604). If no match exists, the transaction aggregator background processing unit 422 will determine if a new batch has been created which is not listed in the batch list of the foreign key (block 609). If a new batch exists, control returns to block 607. If not, the transaction aggregator background processing unit 422 will determine if the table name is found in a schema batch list (block 610) and, if there is a match, the batch identification from the schema batch list is returned (block 604).

Figure 7:
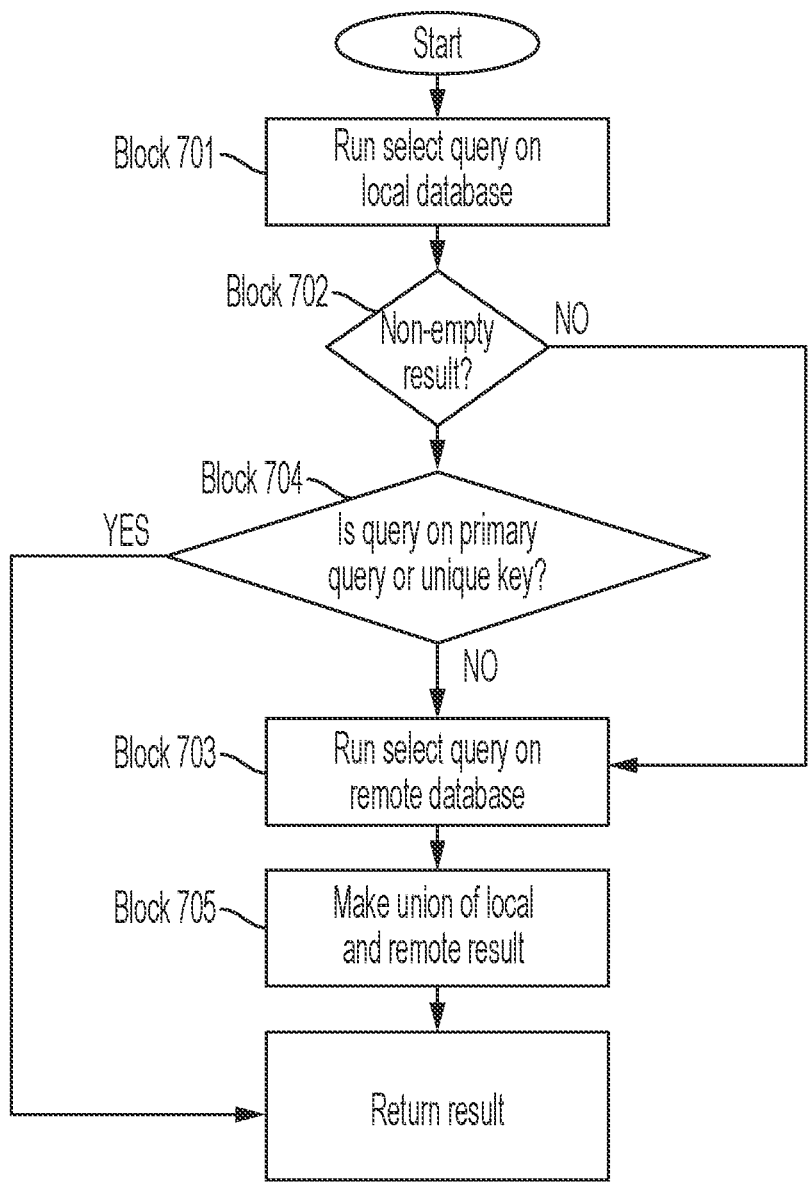
FIG. 7 is a flow diagram illustrating how requests can be locally and remotely processed in accordance with one or more embodiments of the present invention.

With continued reference to FIG. 4 and with additional reference to FIG. 7, in some cases, such as those in which a query operation is partially processed at the local storage 403, it can be more efficient to complete processing at the remote storage 405 (or it can be required that processing be completed at the remote storage 405). In these or other cases, an additional request is received for a read/write operation from a user and this additional request can be distinguished from the others in that it should be or needs to be initially processed locally so that the request (i.e., a selected query) is passed to the local storage 403 and run on a local database (701). It is then determined whether there is a non-empty result (block 702) and, if not (i.e., if there is an empty result at the local storage 403), the additional request is batched and passed to the remote storage 405 to be run on a remote database of the remote storage 405 (block 703). If there is a non-empty result from the local processing, it is determined whether the additional request has been fulfilled (block 704). If not, control proceeds to block 703. A union of local and remote results are then combined (block 705).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for optimizing input/output (I/O) operations per second (IOPS) of remote storage, the computer-implemented method comprising:
   receiving requests for read operations and write operations from users of an application;
   dynamically creating batches into which the requests can be aggregated;
   aggregating the requests into the batches; and
   asynchronously passing each completed batch to the remote storage,
   wherein the aggregating of the requests into the batches comprises grouping requests of a same type together and finding a batch for each request,
   the finding of the batch for each request comprising sequentially:
      first identifying of a first match between a table name describing a type of the request and a table name of a batch list,
      second identifying of a second match, in an event the first match is not identified, between the table name describing the type of the request and a table name of a foreign key batch list such that the second identifying differs from the first identifying, and
      third identifying of a third match, in an event the second match is not identified, between the table name describing the type of the request and a table name of a schema batch list such that the third identifying differs from the first and second identifying.

2. The computer-implemented method according to claim 1, further comprising asynchronously passing each completed batch and each uncompleted batch to the remote storage in an event of a restart of the application.

3. The computer-implemented method according to claim 1, further comprising:
   receiving additional requests for read/write operations from the users;
   distinguishing the additional requests from the requests; and
   passing the additional requests to local storage.

4. The computer-implemented method according to claim 3, further comprising aggregating the additional requests into batches with the requests.

5. The computer-implemented method according to claim 1, wherein:
   the dynamically creating of the batches is executed in accordance with batch quantity and batch frequency determinations,
   the batch quantity determinations are based on pattern identification in database traffic data, and
   the batch frequency determinations are based on relative quantities of the read operations and the write operations.

6. A computer program product for optimizing input/output (I/O) operations per second (IOPS) of remote storage, the computer program product comprising one or more computer readable storage media having computer readable program code collectively stored on the one or more computer readable storage media, the computer readable program code being executed by a processor of a computer system to cause the computer system to perform a method comprising:
   receiving requests for read operations and write operations from users of an application;
   dynamically creating batches into which the requests can be aggregated;
   aggregating the requests into the batches; and
   asynchronously passing each completed batch to the remote storage,
   wherein the aggregating of the requests into the batches comprises grouping requests of a same type together and finding a batch for each request,
   the finding of the batch for each request comprising sequentially:
      first identifying of a first match between a table name describing a type of the request and a table name of a batch list,
      second identifying of a second match, in an event the first match is not identified, between the table name describing the type of the request and a table name of a foreign key batch list such that the second identifying differs from the first identifying, and
      third identifying of a third match, in an event the second match is not identified, between the table name describing the type of the request and a table name of a schema batch list such the third identifying differs from the first and second identifying.

7. The computer program product according to claim 6, further comprising asynchronously passing each completed batch and each uncompleted batch to the remote storage in an event of a restart of the application.

8. The computer program product according to claim 6, further comprising:
   receiving additional requests for read/write operations from the users;

distinguishing the additional requests from the requests; and passing the additional requests to local storage.

9. The computer program product according to claim 8, further comprising aggregating the additional requests into batches with the requests.

10. The computer program product according to claim 6, wherein:
the dynamically creating of the batches is executed in accordance with batch quantity and batch frequency determinations,
the batch quantity determinations are based on pattern identification in database traffic data, and
the batch frequency determinations are based on relative quantities of the read operations and the write operations.

11. A computing system comprising:
a processor;
a memory coupled to the processor; and
one or more computer readable storage media coupled to the processor, the one or more computer readable storage media collectively containing instructions that are executed by the processor via the memory to implement a method for optimizing input/output (I/O) operations per second (IOPS) of remote storage comprising:
receiving requests for read operations and write operations from users of an application;
dynamically creating batches into which the requests can be aggregated;
aggregating the requests into the batches; and
asynchronously passing each completed batch to the remote storage,
wherein the aggregating of the requests into the batches comprises grouping requests of a same type together and finding a batch for each request,
the finding of the batch for each request comprising sequentially:
first identifying of a first match between a table name describing a type of the request and a table name of a batch list,
second identifying of a second match, in an event the first match is not identified, between the table name describing the type of the request and a table name of a foreign key batch list such that the second identifying differs from the first identifying, and
third identifying of a third match, in an event the second match is not identified, between the table name describing the type of the request and a table name of a schema batch list such that the third identifying differs from the first and second identifying.

12. The computing system according to claim 11, further comprising asynchronously passing each completed batch and each uncompleted batch to the remote storage in an event of a restart of the application.

13. The computing system according to claim 11, further comprising:
receiving additional requests for read/write operations from the users;
distinguishing the additional requests from the requests;
passing the additional requests to local storage.

14. The computing system according to claim 11, wherein:
the dynamically creating of the batches is executed in accordance with batch quantity and batch frequency determinations,
the batch quantity determinations are based on pattern identification in database traffic data, and
the batch frequency determinations are based on relative quantities of the read operations and the write operations.

15. The computer-implemented method according to claim 1, further comprising:
running an additional request on local storage and on the remote storage; and
combining results into a union of the running of the additional request on the local storage and the running of the additional request on the remote storage.

16. The computer program product according to claim 6, wherein the method for the optimizing of the I/O IOPS of the remote storage further comprises:
running an additional request on local storage and on the remote storage; and
combining results into a union of the running of the additional request on the local storage and the running of the additional request on the remote storage.

17. The computing system according to claim 11, wherein the method for the optimizing of the I/O IOPS of the remote storage further comprises:
running an additional request on local storage and on the remote storage; and
combining results into a union of the running of the additional request on the local storage and the running of the additional request on the remote storage.

\* \* \* \* \*